(12) United States Patent
Chou et al.

(10) Patent No.: US 10,333,380 B2
(45) Date of Patent: Jun. 25, 2019

(54) ELECTRONIC DEVICE

(71) Applicant: Wistron Corporation, New Taipei (TW)

(72) Inventors: Ying-Tzu Chou, New Taipei (TW); Chin-Min Liu, New Taipei (TW); Meng-Ru Tsai, New Taipei (TW)

(73) Assignee: Wistron Corporation, New Taipei (TW)

( * ) Notice: Subject to any disclaimer, the term of this patent is extended or adjusted under 35 U.S.C. 154(b) by 270 days.

(21) Appl. No.: 15/494,546

(22) Filed: Apr. 24, 2017

(65) Prior Publication Data

US 2018/0175628 A1 Jun. 21, 2018

(30) Foreign Application Priority Data

Dec. 21, 2016 (TW) .............................. 105142346 A

(51) Int. Cl.
*H02J 1/10* (2006.01)
*H02J 3/38* (2006.01)
(Continued)

(52) U.S. Cl.
CPC .............. *H02M 1/08* (2013.01); *H02J 7/0054* (2013.01); *H02J 7/0068* (2013.01); *H02M 2001/0009* (2013.01)

(58) Field of Classification Search
CPC ............. H02M 1/08; H02M 2001/0009; H02J 7/0054; H02J 7/0068
See application file for complete search history.

(56) References Cited

U.S. PATENT DOCUMENTS 9,912,112 B1 * 3/2018 Black .................. H01R 25/006
2006/0094290 A1 * 5/2006 Pyrros ................. H01R 13/514
439/535
(Continued)

FOREIGN PATENT DOCUMENTS

TW          201131923           9/2011
TW          201618396           5/2016

OTHER PUBLICATIONS

"Office Action of Taiwan Counterpart Application," with partial English translation thereof, dated Aug. 1, 2017, p. 1-p. 9.

*Primary Examiner* — Alfonso Perez Borroto
*Assistant Examiner* — Esayas G Yeshaw
(74) *Attorney, Agent, or Firm* — JCIPRNET

(57) ABSTRACT

An electronic device is provided. The electronic device includes a plurality of expansion connector modules, a power supply path switch circuit, a system load and a controller. The power supply path switch circuit includes a plurality of input ends connected to output ends of expansion connector modules respectively. The system load is coupled to the power supply path switch circuit. The controller is coupled to the expansion connector module and the power supply path switch circuit. The controller determines whether a first power supply source is coupled to one of the expansion connector modules through the expansion connector modules. When the first power supply source is connected to the one of the expansion connector modules, the controller detects the power of the first power supply source via the expansion connector module connected to the first power supply source. Then, the controller adjusts a power supply direction between the expansion connector module connected to the first power supply source and the system load according to the power of the first power supply source.

11 Claims, 4 Drawing Sheets

(51) Int. Cl.
  *H02M 1/08*   (2006.01)
  *H02J 7/00*   (2006.01)
  *H02M 1/00*   (2006.01)

(56) References Cited

U.S. PATENT DOCUMENTS

| | | | |
|---|---|---|---|
| 2011/0217875 A1 | 9/2011 | Lee | |
| 2013/0197704 A1* | 8/2013 | Pan | H02J 3/36 |
| | | | 700/287 |
| 2015/0333544 A1* | 11/2015 | Toya | H01M 10/48 |
| | | | 320/112 |
| 2017/0256825 A1* | 9/2017 | Sun | H01M 10/425 |
| 2018/0294738 A1* | 10/2018 | Williams | H02M 5/293 |

* cited by examiner

ELECTRONIC DEVICE

CROSS-REFERENCE TO RELATED APPLICATION

This application claims the priority benefit of Taiwan application serial no. 105142346, filed on Dec. 21, 2016. The entirety of the above-mentioned patent application is hereby incorporated by reference herein and made a part of this specification.

BACKGROUND OF THE INVENTION

1. Field of the Invention

The invention relates to a technique of managing power supply and particularly relates to an electronic device to which the technique of managing power supply applies.

2. Description of Related Art

Generally speaking, traditional expansion connection interfaces (such as USB Type A, USB Type B, USB Mini-A, USB Mini-B, USB Micro-A, USB Micro-B and the like) all supply power in a single direction. For example, whenever an expansion device is connected to an electronic device via the expansion connection interface, the electronic device is always a delivery point and supplies power to the expansion device. With the development of technology, the expansion connection interface capable of high-power transmission and two-way power supply has been gradually applicable to all kinds of electronic devices such as an electronic device using a USB Type-C connector.

When the expansion device is connected to the electronic device via the expansion connection interface capable of two-way power supply, the electronic device and the expansion device may take turns serving as delivery points. Although the expansion connection interface capable of two-way power supply significantly heightens the flexibility of power supply, how to manage power supply effectively between a plurality of power supply sources, an expansion device and an electronic device is a new topic in the field.

SUMMARY OF THE INVENTION

The invention provides an electronic device. The distribution of power sources may be managed by connecting a plurality of power supply sources or an expansion device to the electronic device, so the flexibility of distributing power sources is heightened.

An electronic device according to an embodiment of the invention is provided. The electronic device includes a plurality of expansion connector modules, a power supply path switch circuit, a system load and a controller. The power supply path switch circuit includes a plurality of input ends connected to output ends of the expansion connector modules respectively. The system load is coupled to the power supply path switch circuit. The controller is coupled to the expansion connector module and the power supply path switch circuit. The controller determines whether a first power supply source is coupled to one of the expansion connector modules through the expansion connector modules. When the first power supply source is connected to the one of the expansion connector modules, the controller detects a power of the first power supply source via the expansion connector module connected to the first power supply source. Then, the controller adjusts a power supply direction between the connected expansion connector module and the system load in the power supply path switch circuit according to the power of the first power supply source.

In view of the foregoing, the electronic device according to embodiments of the invention has the controller that adjusts the power supply path switch circuit according to the power of the power supply source coupled to the electronic device to set up the power supply direction. Accordingly, in the embodiments of the invention, adjustments may be made to directions where power is input or output between devices, making devices supply power to each other and to heighten the flexibility of distributing the power sources.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
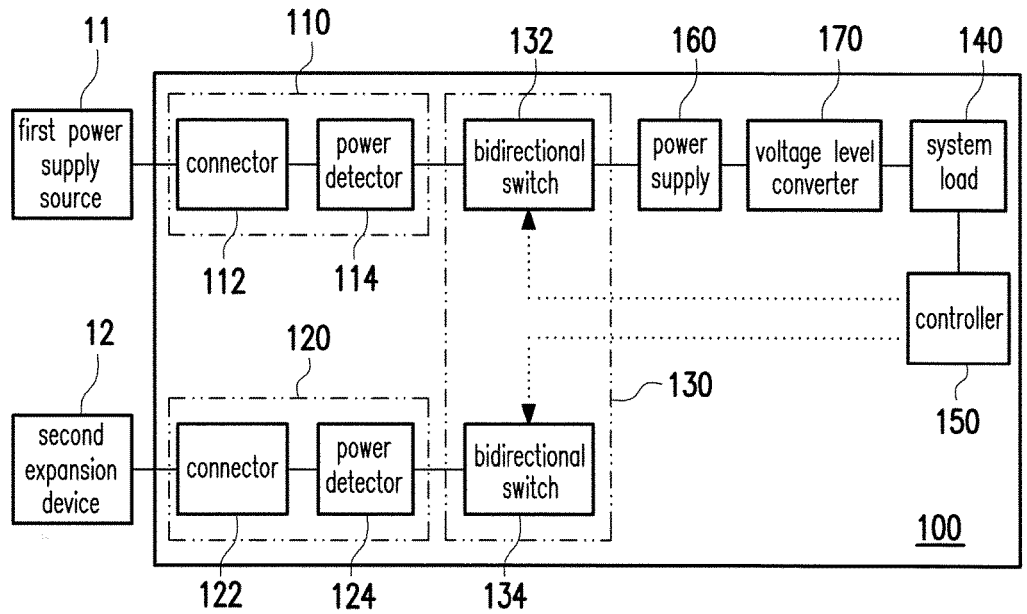
FIG. 1 is a schematic view illustrating an electronic device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic view illustrating an electronic device according to an embodiment of the invention. Referring to FIG. 1, a first power supply source 11 and a second expansion device 12 may be connected to an electronic device 100 based on a user's demand. For easy understanding, in the description about the electronic device 100, the first power supply source 11 and the second expansion device 12 may be coupled to an expansion connector module 110 and an expansion connector module 120 respectively, but the disclosure is not limited thereto. For example, in other embodiments, the first power supply source 11 and a third power supply source may be coupled to the expansion connector modules 110 and 120 respectively.

The first power supply source 11 may be a power source adapter or a corresponding charging wire and is connected to an AC power source or a mobile power bank. The second expansion device 12 may be any kind of consumer electronic products such as a desktop computer, a laptop, a tablet, a mobile phone and the like. The disclosure is not limited to the types of the first power supply source 11 and the second expansion device 12.

The electronic device 100 of the embodiment may be any kind of consumer electronic products such as a desktop computer, a laptop, a tablet, a mobile phone, a set-top box, a digital television allowing external connection to an expansion device, a refrigerator allowing external connection to an expansion device and the like. In some embodiments, the electronic device 100 of the embodiment may also be a USB Type-C hub or adaptor. Nonetheless, the disclosure is not limited thereto. All electronic devices with a connection interface capable of coupling an external expansion device are applicable to the disclosure.

The electronic device 100 of the embodiment may have two expansion connector modules 110 and 120, a power supply path switch circuit 130, a system load 140 and a controller 150. In the embodiment, the electronic device 100 is equipped with a power supply 160 and a voltage level converter 170.

The expansion connector modules 110 and 120 are configured to provide a connection interface between power supply sources (such as the first power supply source 11) or an external expansion device (such as the second external expansion device 12) and the electronic device 100. In the embodiment, the number of the expansion connector modules 110 and 120 is two, but the invention is not limited thereto. For example, the number of the expansion connector modules 110 and 120 may amount to three or more.

The expansion connector module 110 is taken as an example for description. The expansion connector module 110 has a connector 112 and a power detector 114. The connector 112 has a socket or a plug (not shown) for providing power supply sources or enabling an external expansion device to be coupled to the electronic device 100. In the embodiment, a Type-C connector compatible with the USB 3.1 standard (USB 3.1 Type-C connector) is particularly chosen as the connector of the expansion connector modules 110 and 120. In other words, a user may insert the first power supply source 11 with a Type-C connector into the connector 112 of the expansion connector module 110, enabling the first power supply source 11 to be coupled to the electronic device 100. Accordingly, a charge/discharge operation between the electronic device 100 and the first power supply source 11 may be carried out.

The power detector 114 is configured to detect a power of the first power supply source 11 connected to the connector 112. In the embodiment, the power detector 114 is operated by a current detector (not shown) and a voltage level detector (not shown) together. By detecting current intensity and voltage level, the controller 150 obtains the power of the first power supply source 11.

The expansion connector module 120 is the same as the expansion connector module 110 in terms of circuit members and operation. In the embodiment, the user may insert the second expansion device 12 with a Type-C connector into the connector 122 of the expansion connector module 120 to couple the second expansion device 12 to the electronic device 100.

The power supply path switch circuit 130 is coupled to the expansion connector modules 110 and 120 to switch a power supply direction between the expansion connector modules 110 and 120 and the system load 140. In the embodiment, the power supply path switch circuit 130 is formed by a plurality of bidirectional switches 132 and 134 such as a plurality of bidirectional switches formed by metal oxide semiconductors. The bidirectional switches 132 and 134 correspond to the different expansion connector modules 110 and 120 respectively to control a power supply direction between each of the expansion connector modules 110 and 120 and the system load 140. Taking the bidirectional switch 132 for instance, an input end (not shown) of the bidirectional switch 132 is connected to an output end of the expansion connector module 110. Accordingly, the controller 150 is able to adjust a power supply direction between the expansion connector module 110 and the system load 140 by controlling the bidirectional switch 132. In other embodiments, the number of bidirectional switches used in the power supply path switch circuit 130 corresponds to the number of the expansion connector modules. The disclosure is not limited thereto.

The system load 140 is coupled to the power supply path switch circuit 130 to provide power required by the operations of the electronic device 100. The controller 150 is coupled to the power supply path switch circuit 130 and the system load 140 to adjust the bidirectional switches 132 and 134 of the power supply path switch circuit 130 respectively according to the power of the first power supply source 11 detected by the power detector 114, a power of the second expansion device 12 detected by a power detector 124 and a system power of the system load 140. The controller 150 of the embodiment is implemented as an embedded system.

In the embodiment, the electronic device 100 is equipped with the power supply 160 and the voltage level converter 170. The power supply 160 may be, for example, a chargeable battery. In other embodiments, the power supply 160 may also be an external power supply unit or a power cable coupled to alternating current. The disclosure is not limited to the type. The voltage level converter 170 is coupled to the expansion connector modules 110 and 120 and the system load 140 to convert a voltage provided by the first power supply source 11 or the second expansion device 12 into a voltage suitable for the electronic device 100.

In the embodiment, the USB 3.1 Type-C connector is chosen as the connector 112 of the expansion connector module 110 and a connector 122 of the expansion connector module 120. Compared with common Type-A connectors compatible with the standards of USB 1.0, USB 2.0, or USB 3.0 on the market, the electronic devices using a Type-A connector may merely supply power to other electronic devices requiring lower power through the Type-A connector. For example, a laptop with a Type-A connector supplies power to a USB storage device and a USB fan. However, regarding the technology of USB power delivery, a Type-C connection interface compatible with the USB 3.1 standard is able to afford a voltage of 20 volts and a current of 5 A and has the ability to transmit power of up to 100 watts. Since the Type-C connector is able to supply higher power, an electronic device with the Type-C connector as a charging interface is also being developed rapidly. For example, power is supplied to a laptop through the Type-C connector.

In addition to the characteristics of a reversible plug and the ability to support a high rate of transmission, the Type-C connector also has a characteristic of two-way charging. For example, when a mobile phone is connected to a laptop through the Type-A connector, the laptop supplies power while the mobile phone receives power. However, if the mobile phone is connected to the laptop through the Type-C connector, the mobile phone may supply power to the laptop. Moreover, the laptop may also supply power to the mobile phone. Consequently, compared with the existing connector, the electronic device using the Type-C connector provides more flexibility in the distribution of power.

Generally speaking, if the user does not specifically arrange in the controller which device to supply power, devices on ends of the Type-C connector may take turns supplying and receiving power. Reference is made to the specification of the Type-C connector for specific power supply standards. However, if the electronic device 100 has a plurality of the Type-C connectors and is connected to a plurality of power supply sources and expansion devices, how to manage the distribution of power between the power supply sources, the expansion devices and the electronic device to provide flexible yet stable power supply is a topic for using the Type-C connector.

To provide more stable and sufficient power supply, in the electronic device 100 of the embodiment, the controller 150 controls the power supply path switch circuit 130 to adjust a power supply direction according to the power of the first power supply source 11 and the second expansion device that are connected to the expansion connector modules 110 and 120 detected by the expansion connector modules 110 and 120 and the system power required by the system load 140. Regarding how the controller 150 controls the power supply path switch circuit 130 to adjust the power supply direction, reference is made to the flowcharts and related descriptions in FIGS. 2-5.

Figure 2:
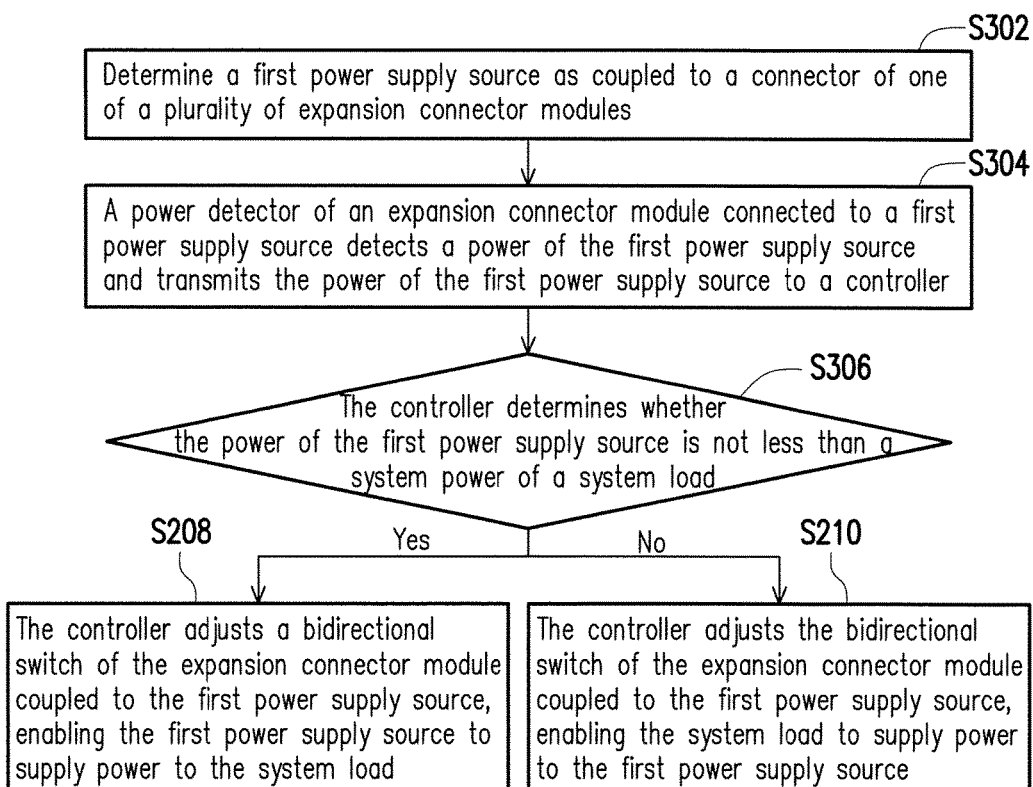
FIG. 2 is a flowchart illustrating operations of connecting a first power supply source to an electronic device according to an embodiment of the invention.

FIG. 2 is a flowchart illustrating operations of connecting the first power supply source to the electronic device according to an embodiment of the invention. Referring to FIGS. 1 and 2 at the same time, in step S202, when the first power supply source 11 is inserted into the connector 112 of the expansion connector module 110, the controller 150 determines the first power supply source 11 as coupled to the connector 112 of one of the plurality of the expansion connector modules through the expansion connector module 110. At this moment, in step S204, the expansion connector module 110 connected to the first power supply source 11 detects the power of the first power supply source 11 via the power detector 114 and transmits a power value of the first power supply source 11 to the controller 150. In step S206, the controller 150 determines whether the power of the first power supply source 11 is not less than the system power of the system load 140. If yes (that is, the power of the first power supply source 11 is not less than the system power of the system load 140), in step S208, the controller 150 adjusts the bidirectional switch 132 corresponding to the expansion connector module 110 coupled to the first power supply source 11, enabling the first power supply source 11 to supply power to the system load 140. If not (that is, the power of the first power supply source 11 is less than the system power of the system load 140), in step S210, the controller 150 adjusts the bidirectional switch 132 corresponding to the expansion connector module 110 coupled to the first power supply source 11, enabling the power supply 160 to supply power to the system load 140 and the first power supply source 11.

Figure 3:
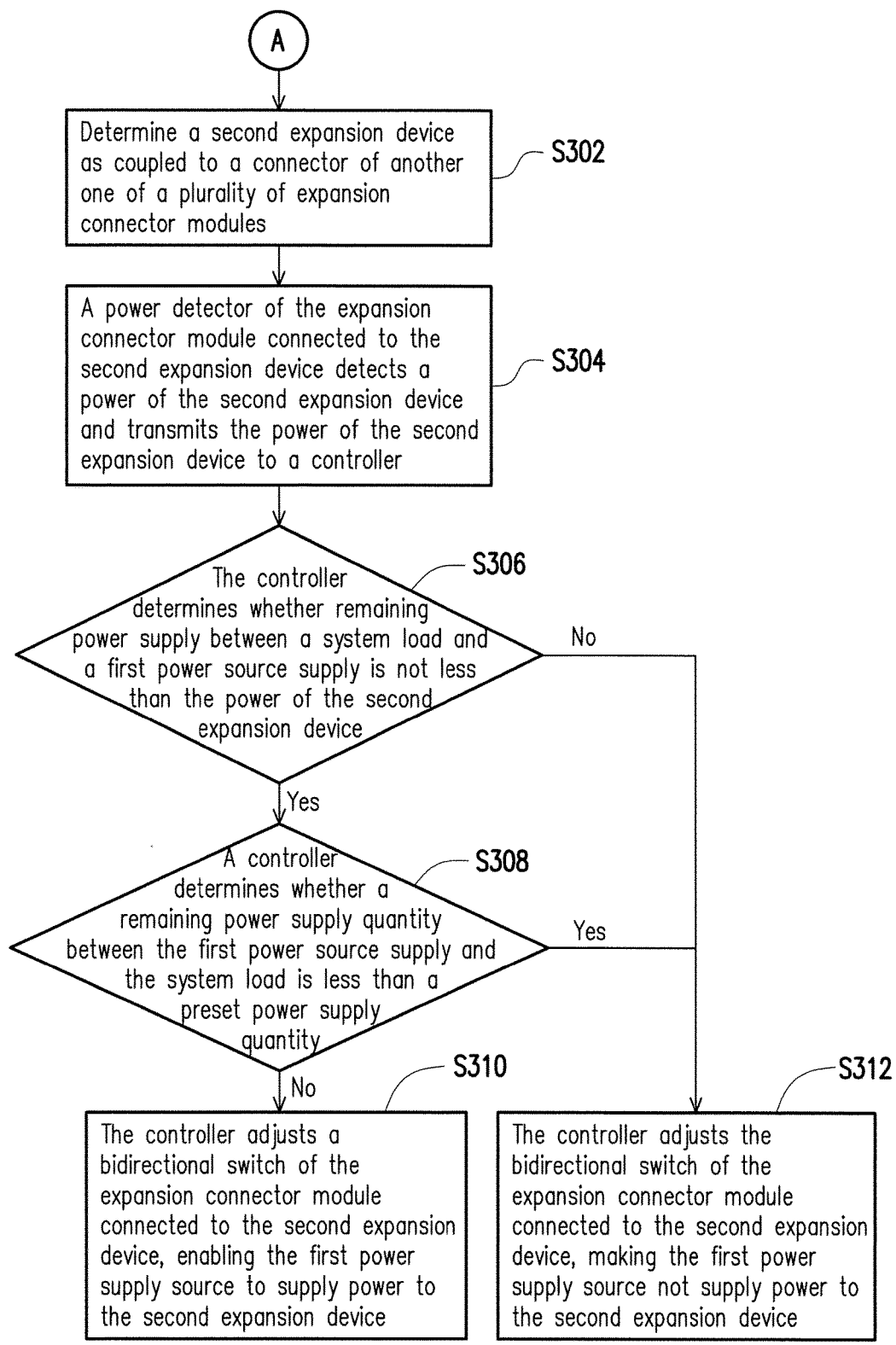
FIG. 3 is a flowchart illustrating operations of connecting a second expansion device to an electronic device according to an embodiment of the invention.

FIG. 3 is a flowchart illustrating operations of connecting the second expansion device to the electronic device in the first situation according to an embodiment of the invention. In the case that the first power supply source 11 supplies power to the system load 140, in step S302, the controller 150 determines the second expansion device 12 as coupled to the connector 122 of the expansion connector module 120 through the expansion connector module 120. At this moment, in step S304, the power detector 124 of the expansion connector module 120 coupled to the second expansion device 12 detects the power of the second expansion device 12 and transmits a power value of the second expansion device 12 to the controller 150. Next, in step S306, the controller 150 determines whether remaining power supply between the system load 140 and the first power supply source 11 is not less than the power of the second expansion device 12. Since the first power supply source 11 supplies power to the system load 140, remaining power may be distributed to other devices for use while the first power supply source 11 supplies power to the system load 140.

For instance, if the power of the first power supply source 11 is 45 watts, and a system power demand of the system load 140 is 30 watts, the remaining power supply is 15 watts.

If the result determined in step S306 is yes (the remaining power supply is not less than the power of the second expansion device 12), in step S308, the controller 150 determines whether a remaining power supply quantity between the first power supply source 11 and the system load 140 is less than a preset power supply quantity. The preset power supply is set up by the user on his own or already set up in the factory setting of the electronic device 100. In addition, since the first power supply source 11 supplies power to the system load 140, the remaining power supply quantity refers to the remaining power supply quantity of the first power supply source 11. In other words, step S308 is to evaluate whether the first power supply source 11 has sufficient power to be supplied to the second expansion device 12 by determining whether the remaining power supply quantity of the first power supply source 11 is less than the preset power supply quantity. If the result determined in step S308 is no (that is, the remaining power supply quantity is not less than the preset power supply quantity), the remaining power supply quantity of the first power supply source 11 is sufficient. Consequently, in step S310, the controller 150 adjusts the bidirectional switch 134 corresponding to the expansion connector module 120 connected to the second expansion device 12, enabling the first power supply source 11 to also supply power to the second expansion device 12 at the same time.

On the other hand, if the result determined in step S306 is no (that is, the remaining power supply quantity is less than power required by the second expansion device) or the result determined in step S308 is yes (that is, the remaining power supply quantity is less than the preset power supply quantity), the first power supply source 11 does not have sufficient power to provide for the second expansion device 12. Consequently, in step S312, the controller 150 adjusts the bidirectional switch 134 corresponding to the expansion connector module 120 connected to the second expansion device 12, making the first power supply source 11 not supply power to the second expansion device 12.

Taking the above situation for example, the remaining power supply quantity is 15 watts. Consequently, if the power of the second expansion device 12 inserted into the expansion connector module 120 is not more than 15 watts, and the remaining power supply quantity of the first power supply source 11 is not less than the preset power supply quantity, the first power supply source 11 supplies power to the second expansion device 12. On the contrary, if the power of the second expansion device 12 inserted into the expansion connector module 120 is more than 15 watts, the first power supply source 11 does not supply power to the second expansion device 12.

Figure 4:
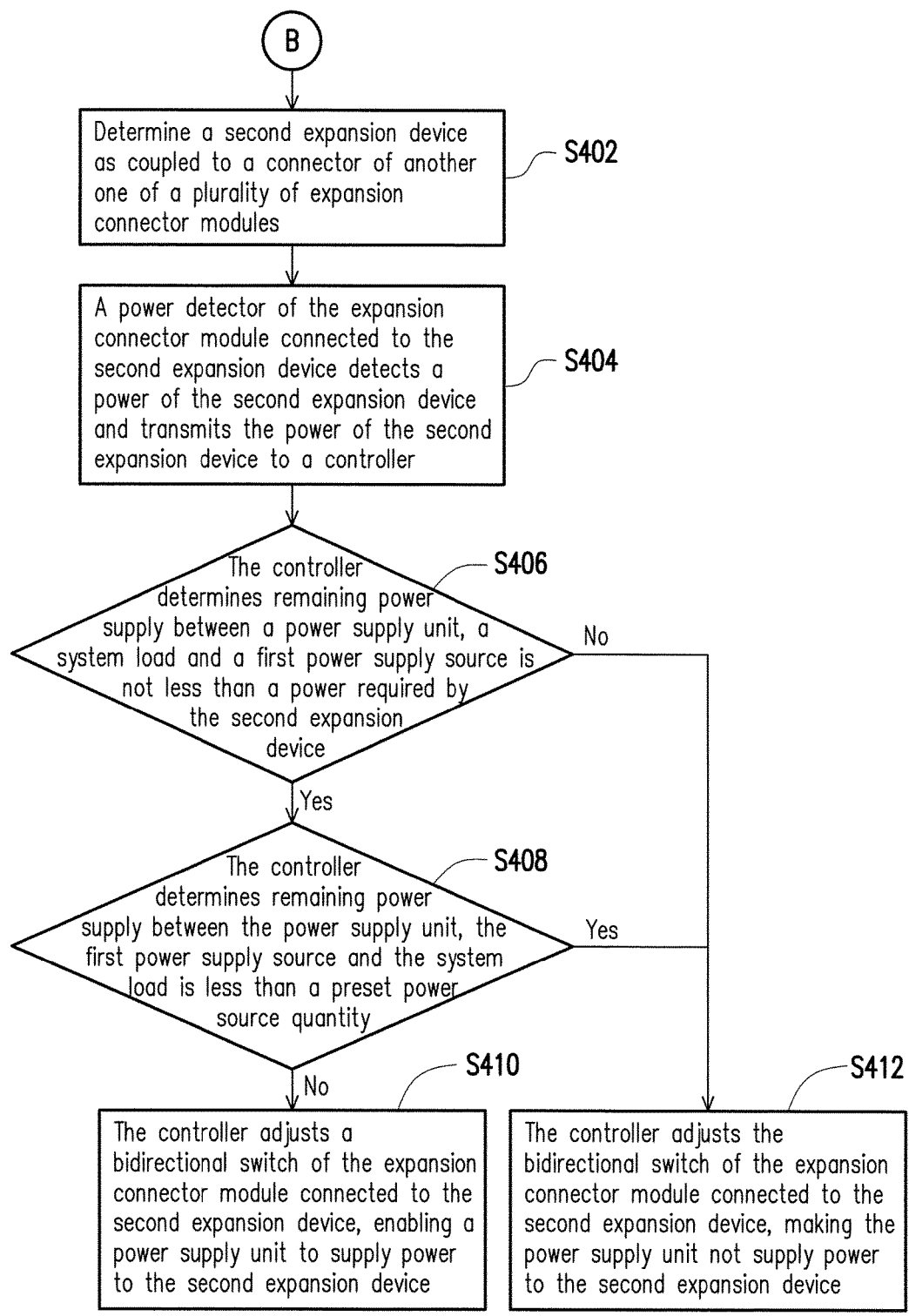
FIG. 4 is a flowchart illustrating operations of connecting a second expansion device to an electronic device according to an embodiment of the invention.

FIG. 4 is a flowchart illustrating operations of connecting the second expansion device connected to the electronic device in the second situation according to an embodiment of the invention. In the case that the power supply 160 supplies power to the first power supply source 11 and the second expansion device 12, in step S402, the controller 150 determines the second expansion device 12 as coupled to the connector 122 of the expansion connector module 120 through the expansion connector module 120. At this moment, in step S404, the power detector 124 of the expansion connector module 120 coupled to the second expansion device 12 detects the power of the second expansion device 12 and transmits the power value of the second expansion device 12 to the controller 150. Next, in step S406, the controller 150 determines whether the remaining power supply between the power supply 160, the system load 140 and the first power supply source 11 is not less than the power of the second expansion device 12. It is worth specifying that the power supply 160 supplies power to the first power supply source 11 and the system load 140, so the remaining power supply as described here refers to remaining power available for other devices while the power supply 160 supplies power to the first power supply source 11 and the system load 140.

For instance, if the power supply 160 is able to supply power of 60 watts, power required by the first power supply source 11 is 20 watts and the system power required by the system load 140 is 20 watts, remaining power is 20 watts.

If the result determined by step S406 is yes (that is, the remaining power supply is not less than the power of the second expansion device 12), in step S408, the controller 150 determines whether the remaining power supply quantity between the power supply 160, the first power supply source 11 and the system load 140 is less than the preset power supply quantity. Since the power supply 160 supplies power to the first power supply source 11 and the system load 140, so the remaining power supply quantity refers to the currently remaining power supply quantity of the power supply 160. If the result determined in step S408 is no, (that is, the remaining power supply quantity is not less than the preset power supply quantity), the controller 150 adjusts the bidirectional switch 134 corresponding to the expansion connector module 120 connected to the second expansion device 12, enabling the power supply 160 to also supply power to the second expansion device 12.

On the other hand, if the result determined by step S406 is no (that is, the remaining power supply is less than the power of the second expansion device), or the result determined in step S408 is yes (that is, the remaining power supply quantity is less than the preset power supply quantity), in step S412, the controller 150 adjusts the bidirectional switch 134 corresponding to the expansion connector module 120 connected to the second expansion device 12, making the power supply 160 not supply power to the second expansion device 12.

Taking the above situation for example again, remaining power is 20 watts. Consequently, if the power of the second expansion device 12 inserted into the expansion connector module 120 is not more than 20 watts, and the remaining power supply quantity of the power supply 160 is not less than the preset power supply quantity, the power supply 160 supplies power to the second expansion device 12. On the contrary, if the power of the second expansion device 12 inserted into the expansion connector module 120 is more than 20 watts, the power supply 160 does not supply power to the second expansion device 12.

Figure 5:
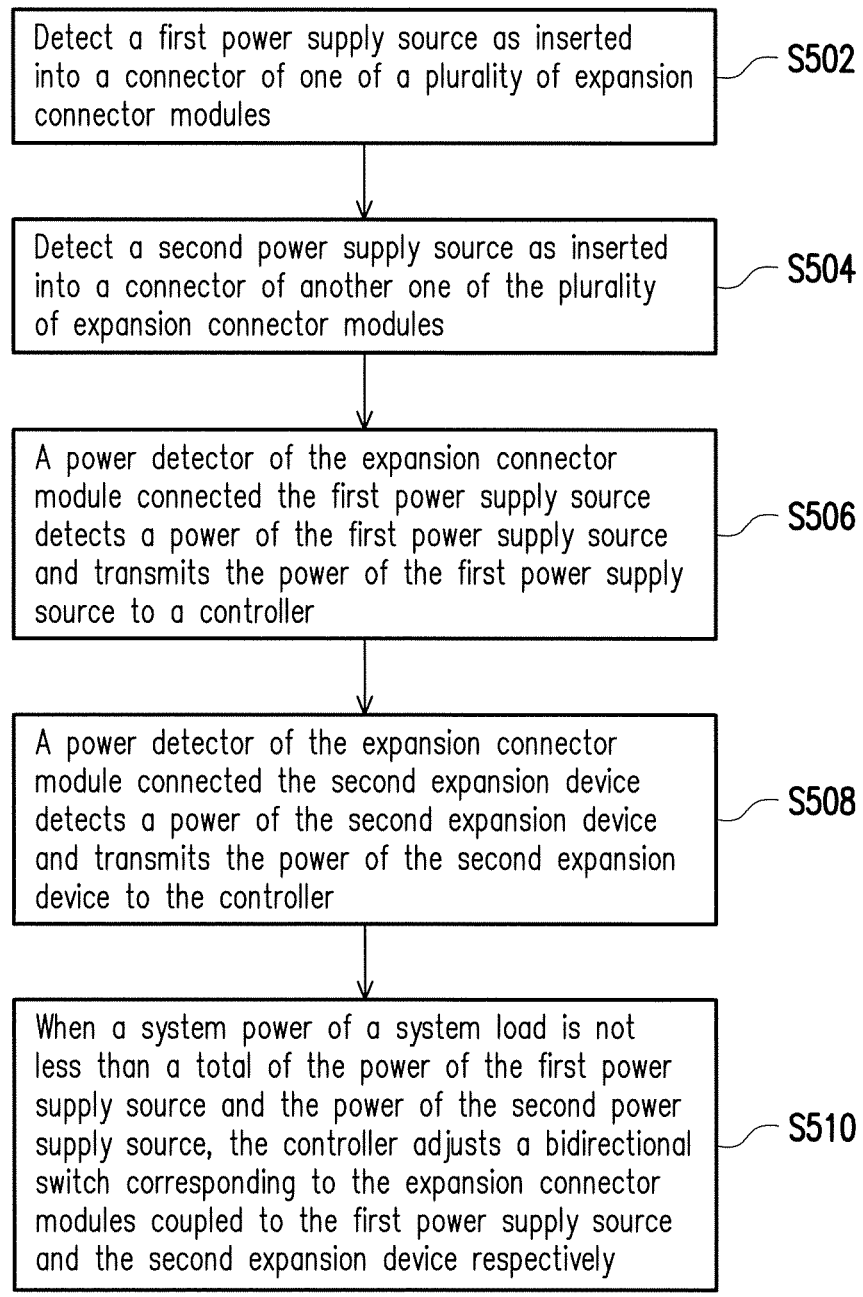
FIG. 5 is a flowchart illustrating operations of connecting a first power supply source and a second expansion device to an electronic device according to another embodiment of the invention.

FIG. 5 is a flowchart illustrating operations of connecting the first power supply source and the second expansion device that are connected to the electronic device according to another embodiment of the invention. Referring to FIGS. 1 and 5 at the same time, in the embodiment, in step S502, if the first power supply source 11 does not have sufficient power to supply the system load 140, but a total of the power of the first power supply source 11 and the second expansion device 12 is sufficient to provide the power required by the system load 140, at this moment, the first power supply source 11 and the second expansion device 12 may supply power to the system load 140 at the same time.

Specifically speaking, in step S502, the controller 150 determines the first power supply source 11 as coupled to the connector 112 of the expansion connector module 110. Moreover, in step S504, the power detector 114 of the expansion connector module 110 transmits the power of the first power supply source 11 to the controller 150. Next, in step S506, the controller 150 determines the second expansion device 12 as coupled to the connector 122 of the expansion connector module 120. Moreover, in step S508, the power detector 124 of the expansion connector module 120 transmits the power of the second expansion device 12 to the controller 150. In step S510, the controller 150 determines that when the system power of the system load 140 is not less than a total of the power of the first power supply source 11 and the power of the second expansion device 12, the controller 150 adjusts the bidirectional switches 132 and 134 respectively corresponding to the expansion connector modules 110 and 120 coupled to the first power supply source 11 and the second expansion device 12 to supply power to the system load 140.

For instance, it is assumed the powers of the first power supply source 11 and the second expansion device 12 are both 15 watts, and the system power required by the system load 140 is 30 watts. At this moment, the total powers of the first power supply source 11 and the second expansion device 12 are 30 watts and are the same as the system power of the system load 140. Consequently, the controller 150 controls the first power supply source 11 and the second expansion device 12 and supplies the power required by the system load 140 at the same time.

In view of the foregoing, the disclosed electronic device has a controller. The controller adjusts the power supply path switch circuit according to the power of the power supply source coupled to the electronic device to adjust the power supply direction. In addition, the controller adjusts the power supply path switch circuit according to the power of the second expansion device or a second power supply source coupled to the electronic device to adjust the power supply direction between the different power supply sources, the expansion device and the system load. Accordingly, when a plurality of devices are in use at the same time, input and output of power between the respective devices may be under control to enable mutual power supply among the devices and to heighten flexibility in the distribution of power sources.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. An electronic device, comprising:
 a plurality of expansion connector modules;
 a power supply path switch circuit comprising a plurality of input ends connected to output ends of the expansion connector modules;
 a system load coupled to the power supply path switch circuit; and
 a controller coupled to the expansion connector module and the power supply path switch circuit, wherein the controller determines whether a first power supply source is coupled to one of the expansion connector modules through the expansion connector modules, when the first power supply source is coupled to the one of the expansion connector modules, the controller detects a power of the first power supply source via the connected expansion connector module and adjusts a power supply direction between the connected expansion connector module and the system load in the power supply path switch circuit according to the power of the first power supply source.

2. The electronic device according to claim 1, wherein the controller determines whether a second expansion device is coupled to another one of the expansion connector modules through the expansion connector modules, when the second expansion device is connected to another one of the expansion connector modules, the controller detects a power of the second expansion device through the expansion connector module connected to the second expansion device and adjusts a power supply direction between the expansion connector module connected to the second expansion device, the system load, and the expansion connector module coupled to the first power supply source in the power supply path switch circuit according to the power of the second expansion device.

3. The electronic device according to claim 1, wherein each of the expansion connector modules comprises:

a connector; and a power detector coupled to the connector to detect a power of an expansion device connected to the connector;

wherein the power supply path switch circuit comprises a plurality of bidirectional switches coupled to the power detectors of the expansion connector modules respectively;

wherein the controller adjusts the bidirectional switch of the expansion connector module connected to the first power supply source according to the power of the first power supply source to control the power supply direction between the expansion connector module and the system load.

4. The electronic device according to claim 3, wherein the connector is an electrical USB Type-C connector.

5. The electronic device according to claim 1, wherein when the controller determines the power of the first power supply source as larger than a system power of the system load, the controller adjusts the power supply path switch circuit such that the first power supply source supplies power to the system load.

6. The electronic device according to claim 5, wherein when the controller detects a second expansion device as inserted into another one of the expansion connect modules through the expansion connector modules, the controller detects a power of the second expansion device via the expansion connector module connected to the second expansion device and determines whether a remaining power supply between the system load and the first power supply source is not less than the power of the second expansion device; and when the controller determines the remaining power supply as not less than the power of the second expansion device, the controller controls the power supply path switch circuit such that the first power supply source supplies power to the second expansion device.

7. The electronic device according to claim 1, further comprising:

a power supply coupled to the system load, wherein when the controller determines the power of the first power supply source as less than a system power of the system load, the controller adjusts the power supply path switch circuit such that the power supply supplies power to the system load and the first power supply source.

8. The electronic device according to claim 6, wherein when the controller detects a second expansion device as inserted into another one of the expansion connector modules through the expansion connector modules, the controller detects the power of the second expansion device via the expansion connector module connected to the second expansion device and determines whether s a remaining power supply between the power supply, the system load and the first power supply source is not less than the power of the second expansion device; and when the controller determines the remaining power supply as not less than the power of the second expansion device, the controller adjusts the power supply path switch circuit such that the power supply supplies power to the second expansion device.

9. The electronic device according to claim 1, wherein when the first power supply source and a second power supply source are inserted into two of the expansion connector modules respectively, the first power supply source and the second power supply source supply power to the system load respectively, wherein a system power of the system load is larger than the power of the first power supply source and is less than a total of the power of the first power supply source and the power of the second power supply source.

10. The electronic device according to claim 2, wherein before the controller adjusts the power supply direction between the expansion connector module connected to the second expansion device, the system load, and the expansion connector module coupled to the first power supply source in the power supply path switch circuit, the controller further determines whether a remaining power supply quantity between the first power supply source and the system load is less than a preset power supply quantity, and when the controller determines the remaining power supply quantity as less than the preset power supply quantity, the controller does not supply power to the second expansion device.

11. The electronic device according to claim 1, further comprising:

a voltage level converter coupled to the expansion connector modules and the system load to convert a voltage between the expansion connector modules and the system load.

* * * * *